United States Patent [19]

Hyde

[11] Patent Number: 4,523,194
[45] Date of Patent: Jun. 11, 1985

[54] REMOTELY OPERATED DOWNHOLE SWITCHING APPARATUS

[75] Inventor: Robert L. Hyde, Bartlesville, Okla.
[73] Assignee: TRW, Inc., Cleveland, Ohio
[21] Appl. No.: 314,665
[22] Filed: Oct. 23, 1981
[51] Int. Cl.³ .................... E21B 47/00; E21B 47/06
[52] U.S. Cl. ............................ 340/856; 73/152;
307/127; 340/857
[58] Field of Search .............. 73/151, 152; 307/114,
307/116, 127, 129, 131; 318/827; 340/856, 857,
825.39; 367/76, 80

[56] References Cited

U.S. PATENT DOCUMENTS

| | | | |
|---|---|---|---|
| 1,933,680 | 11/1933 | Ohl | 175/320 |
| 1,994,325 | 3/1935 | Suits | 171/97 |
| 2,021,753 | 11/1935 | Suits | 171/119 |
| 3,284,669 | 11/1966 | Boyd | 340/856 |
| 3,977,245 | 8/1976 | Clark et al. | 73/151 |
| 4,093,936 | 6/1978 | Eberline et al. | 340/18 |
| 4,157,535 | 6/1979 | Balkanli | 340/18 |
| 4,178,579 | 12/1979 | McGibbeny et al. | 340/856 |

Primary Examiner—Maynard R. Wilbur
Assistant Examiner—K. R. Kaiser
Attorney, Agent, or Firm—Shapiro and Shapiro

[57] ABSTRACT

A remotely operated downhole switching apparatus, particularly adapted to selectively connect a downhole device such as a sensor circuit to a cable which supplies power to a downhole motor includes a switch for connecting the downhole device to a neutral node of the motor, a latch coil responsive to a latching signal carried by the cable for closing the switch, and a delatch coil connected to the cable through a frequency responsive circuit which is responsive to a delatching signal carried by the cable for passing current through the delatch coil. A diode connected to the delatch coil prevents current flow through the delatch coil in a direction which causes the switch to close. An AC signal may be employed for closing the switch, and a voltage pulse may be employed for opening the switch.

17 Claims, 4 Drawing Figures

REMOTELY OPERATED DOWNHOLE SWITCHING APPARATUS

BACKGROUND OF THE INVENTION

This invention relates to remotely controlled switching apparatus which is particularly useful in an oil well or the like for performing downhole switching operations.

There are many industrial installations in which it is desirable to perform switching operations at a remotely disposed, and often inaccessible, location. In an oil well, for example, it is desirable to measure various physical parameters in the downhole environment, such as temperature and pressure, and it is common practice to employ the cable which carries electrical power to a downhole submersible pump motor for carrying signals between a downhole instrumentation package which monitors the desired physical parameters and a control and readout unit on the surface. The downhole motor may be a three-phase Y-connected AC motor, and DC signals may be employed for controlling the downhole instrumentation package and for monitoring the downhole parameters.

In such oil well installations, it is also desirable to measure periodically the motor/cable system insulation to ground resistance, since this gives an early indication of impending motor or cable failure. Such measurements require the use of relatively high voltages, e.g., 500 volts or more. Since the downhole instrumentation package transducers and their associated circuits generally have a much lower impedance to ground than the motor/cable insulation system, it is necessary to disconnect the downhole package from the cable prior to testing and to reconnect the downhole package when testing has been completed. Remotely controlled downhole switching apparatus is employed for this purpose.

One such switching apparatus is disclosed in U.S. Pat. No. 4,178,579 to McGibbeny et al, issued Dec. 11, 1979, and assigned to the same assignee as the present invention. In the McGibbeny et al apparatus, the downhole instrumentation package is connected to the neutral of a three-phase motor by a magnetically biased reed switch. The switch may be opened by applying to the cable a negative voltage of a predetermined magnitude which causes a Zener diode to break down and allows current to flow through a delatch coil. The magnetic field produced by the delatch coil is sufficient to overcome the field of a permanent magnet which holds the switch in closed position once it is closed. To close the switch, a latch coil, whose magnetic field adds to that of the permanent magnet, is energized by rectified AC current flowing in the secondary of a current transformer which has as its primary one of the three-phase lines to the motor.

Typical oil well downhole temperatures run approximately 200° C., which has made it difficult to achieve good reliability and good MTBF (mean time between failures) in downhole switching apparatus. At such temperatures, semiconductor components, such as Zener diodes, are almost at their junction breakdown temperature (typically 300° C.), and are a good portion of the way toward the melting temperature of silicon (approximately 600° C.).

Although the McGibbeny et al switching apparatus performs its switching functions well, it has several disadvantages. The hold-off voltage at the Zener diode in the McGibbeny et al switching apparatus must be relatively high to prevent unwanted delatching by AC offset voltages at the motor neutral, and since the current required for delatching is only about 30 percent less than the absolute maximum rated current of the Zener diode, the power which must be dissipated by the Zener diode during delatching is quite high. Accordingly, delatching time must be limited, or the Zener diode must be cooled, to prevent its failure. In addition, the leakage current through the Zener diode increases with temperature and produces an error in the readout of the downhole instrumentation package. Although the leakage current can be reduced by reducing the junction area of the Zener diode, this reduces the power dissipation capability of the Zener diode and increases the possibility of a junction breakdown.

It is desirable to provide switching apparatus which overcome these and other disadvantages of known switching apparatus, and it is to this end that the present invention is directed.

SUMMARY OF THE INVENTION

The present invention provides remotely operated switching apparatus, particularly adapted for downhole use in an oil well, having improved reliability and MTBF. Significantly, switching apparatus in accordance with the invention does not require Zener diodes, nor other semiconductor components which must dissipate levels of power close to their critical limits. The switching apparatus has a rather simple, inexpensive construction, and is readily adaptable to existing downhole systems.

Briefly stated, in a preferred form, a downhole switching apparatus in accordance with the invention for controlling the connection of the downhole device to a cable which carries energizing current to a downhole motor comprises switch means connected between the downhole device and the cable, the switch means having a closed position at which the downhole device is connected to the cable and having an open position at which the downhole device is disconnected from the cable, latching means responsive to a latching signal carried by the cable for closing the switch means, and delatching means responsive to current flow of a predetermined direction therethrough for opening the switch means. Also included are frequency responsive means, responsive to a delatching signal carried by the cable and capable of passing to the delatching means a current in said predetermined direction and a current in the opposite direction, and means connected to the delatching means for preventing current in said opposite direction from passing through the delatching means.

DETAILED DESCRIPTION OF THE PREFERRED EMBODIMENTS

Figure 1:
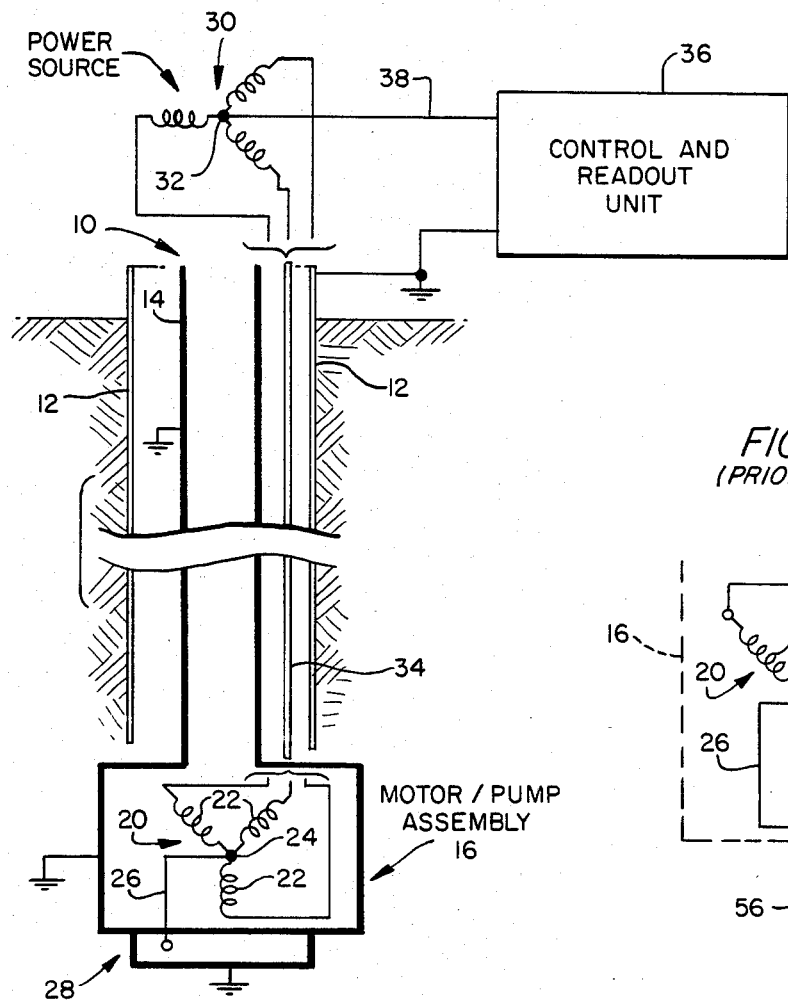
FIG. 1 is a diagrammatic view illustrating a system embodying the invention.

FIG. 1 illustrates an oil well system of the type with which the invention may be employed. As shown, the system includes a bore hole 10 having a casing or liner 12 and a tubing string 14 disposed within the bore hole. A downhole submersible motor/pump assembly 16 may be connected to the lower end of the tubing string for pumping fluids to the surface. Motor 20 (which is illustrated schematically in the figure) may be a three-phase AC motor having three Y-connected windings 22 and an ungrounded neutral node 24 (the pump is not specifically illustrated). An instrumentation package 28 may be mechanically coupled to the housing of the motor/pump assembly 16 and electrically connected to the neutral node of the motor by an electrical conductor 26. As will be described in detail hereinafter, the instrumentation package may include a downhole device such as a sensor circuit for measuring downhole pressure and temperature, and a switching apparatus for controlling the electrical connection of the downhole device to the neutral node of the motor. The motor/pump assembly housing and the instrumentation package housing, as well as casing 12 and tubing string 14, may be electrically connected together and to earth ground, as illustrated.

On the surface, power may be supplied to the motor from a three-phase Y-connected AC power source 30 having an ungrounded neutral node 32 via a power cable 34 which extends downhole between the tubing string 14 and the casing 12. A control and readout unit 36 may be connected between earth ground and the neutral node 32 of power source 30 by an electrical conductor 38. Accordingly, the downhole instrumentation package 28 is electrically connected to the control and readout unit 36 by electrical conductors 26 and 38 and by power cable 34, the return path being earth ground. Control and readout unit 36 may include means, such as voltage and current sources, for controlling the operation of the downhole sensor circuit and for reading data therefrom. The control and readout unit may also include means for generating switching signals which control the downhole switching apparatus for selectively connecting the sensor circuit to power cable 34.

Figure 2:
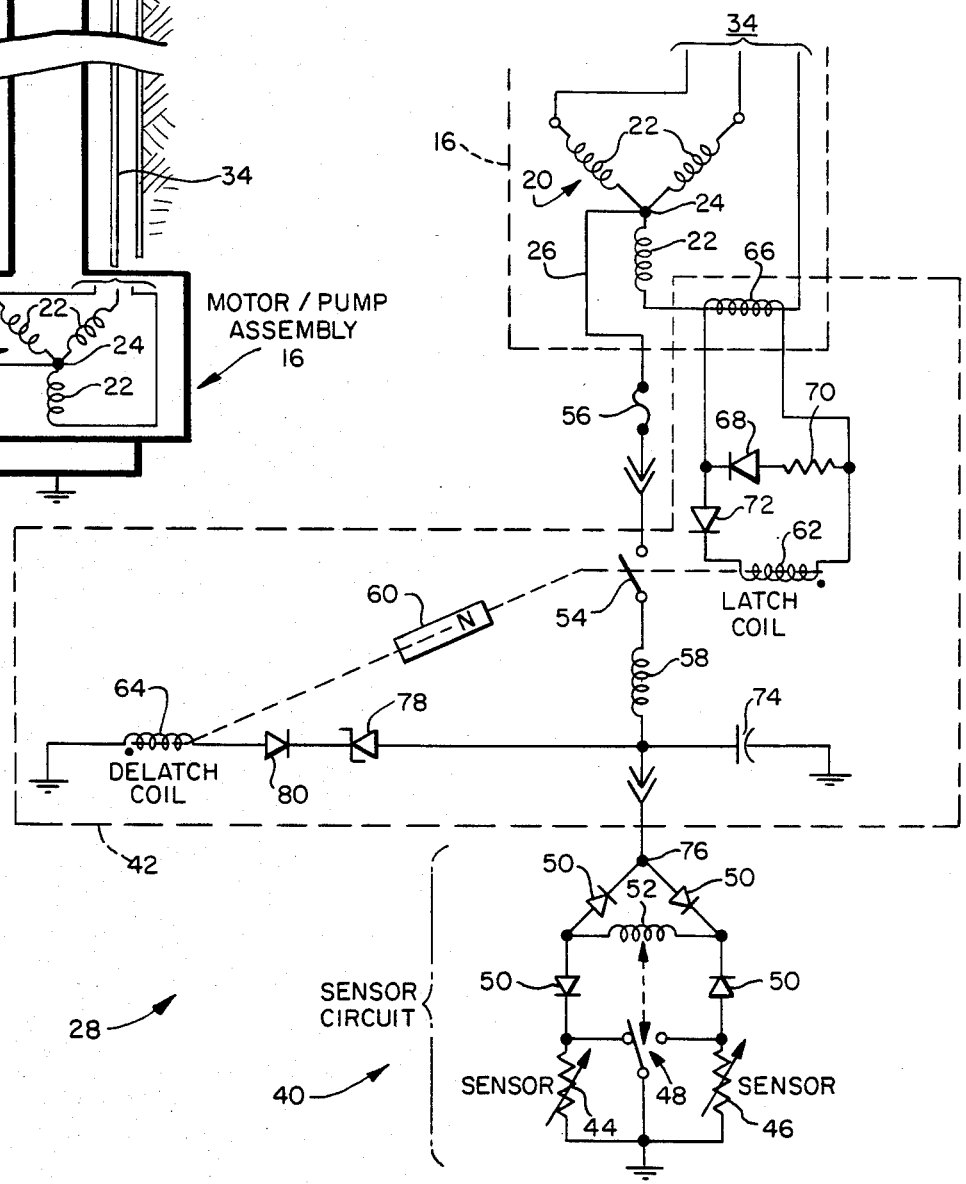
FIG. 2 is a schematic diagram illustrating a known downhole switching apparatus.

FIG. 2 illustrates a known form of a downhole instrumentation package 28 which includes a sensor circuit 40 and a switching apparatus 42 for selectively connecting the sensor circuit to neutral node 24 of motor 20. Sensor circuit 40 and switching apparatus 42 are described in detail in the previously mentioned McGibbeny et al patent, the disclosure of which is incorporated by reference herein. In the description which follows, the sensor circuit and switching apparatus will be described only insofar as is necessary to facilitate an understanding of the present invention. Further details may be had by reference to the McGibbeny et al patent.

Sensor circuit 40 may include a pair of sensors 44, 46 for measuring such downhole parameters as pressure and temperature. The sensors may be variable resistance transducers, the resistances of which vary in accordance with the parameters being sensed. The sensor circuit also includes a single-pole double-throw switch 48 for selectively bypassing each of the sensors, a plurality of steering diodes 50 which establish different electrical current paths through the circuit for different polarity DC currents, and a relay coil 52 which controls the position of switch 48 to enable readout of the different parameters.

Switching apparatus 42 comprises a magnetically operated high breakdown voltage single-pole single-throw normally open reed switch 54 connected to electrical conductor 26 through a fuse 56 and connected to sensor circuit 40 through an inductor 58. When the switch is closed, the sensor circuit is connected to neutral node 24 of the motor and to the control and readout unit 36 (FIG. 1) via power cable 34 and electrical conductor 38. A permanent magnet 60 produces a magnetic field which is sufficient to hold switch 54 in the closed position once it is closed, but which is insufficient to move the switch to the closed position A latch coil 62 and a delatch coil 64 are disposed in polarity opposition around permanent magnet 60 and are respectively employed for closing and opening the switch.

Latch coil 62 receives power from the secondary of a current transformer 66 which has as a single turn primary winding one of the three-phase current paths to motor windings 22. The magnetic core of transformer 66 is designed to saturate easily at low motor currents to limit its output and to minimize its size. A diode 68 and a resistor 70 connected in series are connected across the secondary winding of transformer 66 so that they are in parellel with a diode 72 and latch coil 62 which are connected in series. When current is supplied to the downhole motor, an AC voltage is produced at the secondary of transformer 66. Diode 72 permits current to flow through latch coil 62 in only one direction, which direction is chosen such that the current produces a magnetic field which augments the magnetic field of permanent magnet 60 sufficiently to close switch 54. This connects the sensor circuit 40 to the control and readout unit 36, as previously described. Diode 68 and resistor 70 are employed to prevent a large potential from being applied to diode 72 in its breakdown direction. Once switch 54 is closed, permanent magnet 60 maintains it in closed position, even if power to the motor is interrupted, until the switch is opened by the delatch coil.

As shown in FIG. 2, a capacitor 74 is connected between ground and the junction of inductor 58 and input 76 of the sensor circuit. Inductor 58 and capacitor 74 constitute a low pass filter, and their values are selected such that at the frequency of the AC power the impedance of inductor 58 is high and the impedance of capacitor 74 is low. The high attenuation ratio provided by inductor 58 and capacitor 74 substantially eliminates AC voltages at input 76, thereby reducing AC currents which would otherwise flow into sensor circuit 40 from neutral node 24.

The delatch portion of switching apparatus 42 comprises delatch coil 64 connected in series with a Zener diode 78 and a diode 80 to the junction of inductor 58 and input 76 of sensor circuit 40. As shown, Zener diode 78 has its anode connected to input 76, and diode 80 is connected to the Zener diode so as to conduct current only in the breakdown direction of the Zener diode. In order to disconnect sensor circuit 40 from the motor neutral, power to the motor is first turned off. A negative voltage (typically −300 volts DC) which is greater than the breakdown voltage of the Zener diode is then applied to power cable 34 by control and readout unit 36, causing current to flow through the delatch coil. The magnetic field produced by the current flowing through the delatch coil is in opposition to that of the permanent magnet 60 and of sufficient magnitude to open switch 54. The required delatch coil current is of the order of 25 ma.

As previously indicated, the current required for delatching is only approximately 30 percent less than the absolute maximum rated current of the Zener diode; and because of the high downhole temperature and the high power which the Zener diode must dissipate, it is subject to failure. Diode 80 also carries the delatch current and is likewise subject to failure. If either Zener diode 78 or diode 80 fails, signals from sensor circuit 40 will be shunted to ground, preventing measurement of the downhole parameters. Furthermore, even if Zener diode 78 and diode 80 do not fail, as previously indicated the increased leakage current through these devices caused by the high downhole temperatures introduces measurement error. The invention provides switching apparatus which avoids these and other disadvantages of known switching apparatus.

Figure 3:
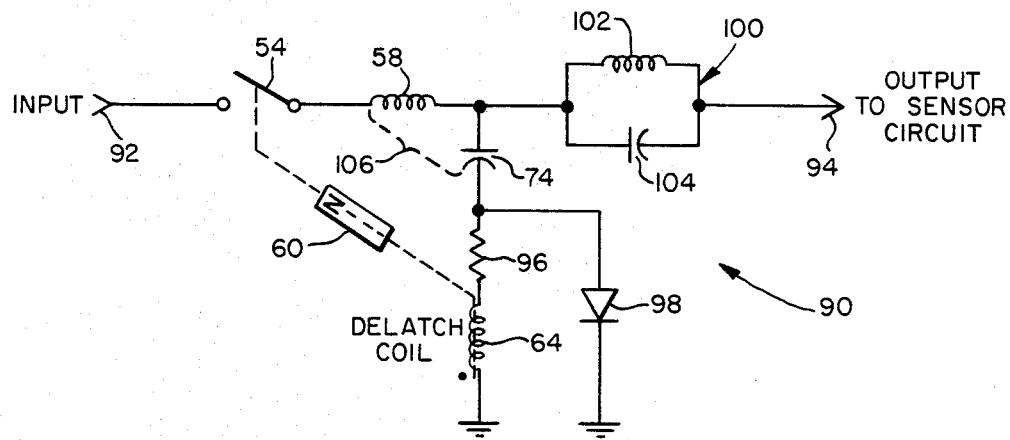
FIG. 3 is a schematic diagram illustrating a first embodiment of a switching apparatus in accordance with the invention.
Figure 4:
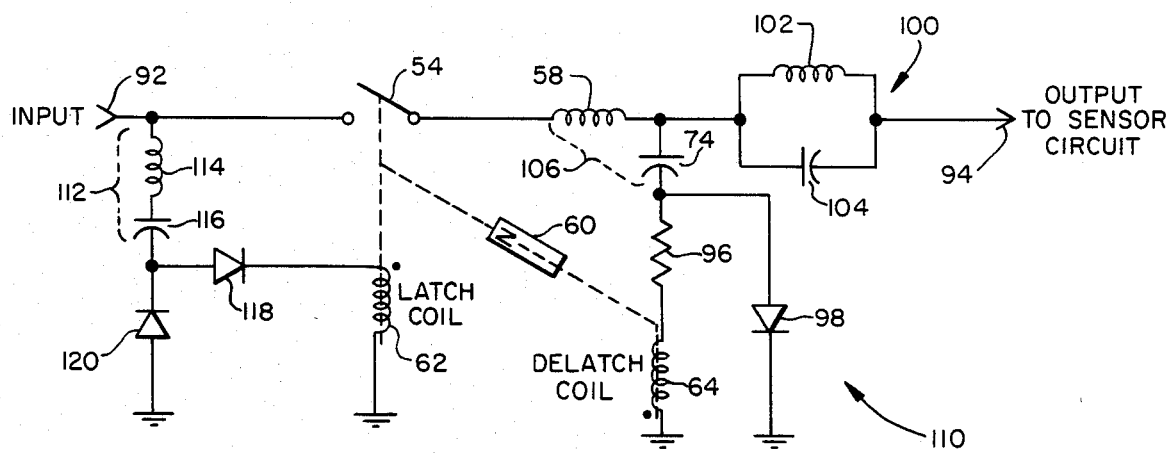
FIG. 4 is a schematic diagram illustrating a second embodiment of a switching apparatus in accordance with the invention.

FIGS. 3 and 4 illustrate, respectively, first and second embodiments of improved switching apparatus in accordance with the invention which may be used for controlling the connection of a downhole device, such as sensor circuit 40 (FIG. 2), to a cable which carries power to a downhole motor. Except as explained hereinafter, either of the switching apparatuses illustrated in FIGS. 3 and 4 may be used in place of switching apparatus 42 of FIG. 2. The switching apparatuses of FIGS. 3 and 4 may include components similar to some of those employed in switching apparatus 42, although in a different circuit configuration, and such components are designated by the same numerals as used in FIG. 2.

FIG. 3 illustrates a switching apparatus 90 in accordance with a first embodiment of the invention. Switching apparatus 90 may have an input 92 adapted to be connected to neutral node 24 of the motor via electrical conductor 26 and fuse 56 (see FIG. 2) and may have an output 94 adapted for connection to input 76 of sensor circuit 40. As shown, rather than being connected to inductor 58 through a diode and a Zener diode as in switching apparatus 42, delatch coil 64 may be connected in series with a resistor 96 and capacitor 74 to inductor 58. A diode 98 may be connected in parallel with the series connection of delatch coil 64 and resistor 96, the anode of the diode being connected to the junction of resistor 96 and capacitor 74 so that positive voltages greater than the forward voltage drop of the diode appearing at that junction will be shunted to ground (for reasons which will be described shortly).

The junction of inductor 58 and capacitor 74 may be connected to the sensor circuit through a parallel resonant circuit 100 comprising an inductor 102 and a capacitor 104. The values of inductor 102 and capacitor 104 are preferably selected to provide a resonant frequency equal to the frequency of the AC power supplied to motor 20, e.g., 60 Hz. Any unbalance between motor phases, or grounding of one phase of the motor, will produce high unbalanced voltages at neutral node 24. Since resonant circuit 100 presents a high impedance at its resonant frequency, it inhibits AC currents produced by such unbalances from flowing through the sensor circuit and allows greater unbalances without affecting the measurement of downhole parameters. As will be explained shortly, inductor 58 and capacitor 74 also constitute a resonant circuit 106, and the impedance of inductor 58 at the AC power frequency further serves to attenuate AC currents flowing to the sensor circuit.

Switch 54 of switching apparatus 90 may be closed, i.e., latched, in the same manner as previously described for switching apparatus 42, wherein (see FIG. 2) a current transformer 66 associated with one phase of the motor produces a current flow through a latch coil 62 to close the switch whenever power is applied to the motor (the latching portion of the apparatus is not illustrated in FIG. 3). Delatching, however, does not rely upon the breakdown of a Zener diode, as does switching apparatus 42, but is accomplished in a somewhat different manner which will now be described.

As in switching apparatus 42, delatch coil 64 is arranged about permanent magnet 60 such that a negative voltage across the delatch coil will cause a current flow through the delatch coil in a direction which produces a magnetic field in opposition to the magnetic field of the permanent magnet. In order to open switch 54, a negative voltage pulse may be produced by control and readout unit 36 and impressed upon power cable 34. As will be described in more detail shortly, inductor 58 and capacitor 74 couple the negative voltage pulse to the series connection of resistor 96 and delatch coil 64. The negative voltage pulse causes a momentary current flow through the delatch coil in a direction which produces a magnetic field in opposition to the magnetic field of permanent magnet 60 and of sufficient magnitude to open switch 54. The switching time of switch 54 is of the order of approximately 10 milliseconds (typically) to 30 milliseconds (maximum).

Inductor 58 and capacitor 74 form a voltage divider which attenuates the AC voltage at input 92 from neutral node 24 of the motor that is applied to resonant circuit 100 and to resistor 96 and delatch coil 64. Therefore, it is desirable to select the values of the inductor and capacitor so that the ratio of the impedance of the inductor to the impedance of the capacitor at the AC power frequency is high enough to prevent the AC voltage at input 92 from causing delatching, except for large unbalances such as caused by grounded cable or motor phases, for example. Delatching will occur when the ratio of the voltage at input 92 to the impedance of inductor 58 is approximately equa.1 to the current required by the delatch coil (approximately 25 ma) to open switch 54. A high impedance ratio also aids resonant circuit 100 in preventing AC current flow through the sensor circuit, thereby protecting the sensor circuit from damage due to large unbalance voltages and currents. Typical values of inductor 58 and capacitor 74 may be 70 henrys and 7 microfarads, respectively, resulting in 60 Hz impedances of approximately 26.4 K ohms and 379 ohms, respectively. The combined resistance of resistor 96 and delatch coil 64 may be 25 ohms, and the forward resistance of diode 98 may be 20 ohms.

These values give an attenuation ratio at the junction of inductor 58 and capacitor 74 of approximately 68:1. At the junction of capacitor 74 and resistor 96, the attenuation ratio is approximately 2413:1 when diode 98 conducts (during the positive half-cycles of the AC voltage) and is approximately 1072:1 when diode 98 is not conducting. Therefore, if the voltage at input 92 is 1500 VAC, for example, the voltage at the input to resonant circuit 100 will be approximately 22 VAC. The voltage across resistor 96 and delatch coil 64 will be approximately 0.62 volts during the positive half-cycles of the AC voltage and approximately 1.4 volts during the negative half-cycles. By appropriately selecting the values of inductor 58, capacitor 74 and resistor 96, switch 54 can be delatched when the voltage at input 92 reaches a predetermined value, thereby protecting the sensor circuit from damage due to large unbalances.

Inductor 58 and capacitor 74 also constitute a frequency selective circuit which, taking into consideration stray inductance and capacitance of the system, has a resonant frequency of approximately 1-5 Hz. Accordingly, by employing a negative delatch pulse having a pulse width preferably greater than 100 milliseconds and less than 1 sec., sufficient negative voltage will be coupled to delatch coil 64 to open switch 54.

Diode 98 prevents positive voltages greater than the forward voltage drop of the diode from appearing across resistor 96 and delatch coil 64, thereby preventing positive voltage transients caused by ringing in resonant circuit 106, for example, from producing current flow thrbugh the delatch coil in a direction which would cause relatching of switch 54. Diodes characteristically have a negative temperature coefficient of forward voltage drop (typically approximately $-2$ mv/° C.). Because of this, the high downhole temperatures aid the clamping action of diode 98 by reducing its forward voltage drop. Additionally, resistor 96 and delatch coil 64 form a voltage divider so that only a portion of the forward voltage drop of the diode actually appears across the delatch coil. The primary purpose of resistor 96 is to insure that the positive voltage applied to the delatch coil due to the forward voltage drop of the diode is insufficient to cause relatching of switch 54. However, by employing a diode having a small forward voltage drop to begin with, e.g., a Schottky barrier diode, it may be possible to eliminate resistor 96 altogether because of the high downhole temperatures and the negative temperature coefficient of the diode.

Switching apparatus 90 avoids the previously mentioned problems caused by diode leakage current in the switching apparatus 42 of FIG. 2. Since the diode leakage current is three or four orders of magnitude less than the delatch current, the increased leakage current of diode 98 caused by the high downhole temperature does not affect delatching. Also, since the diode is in series with capacitor 74, which is preferably a low leakage capacitor, leakage currents which would interfere with the operation of the sensor circuit are substantially eliminated, thereby relaxing the leakage requirements on the diode. Furthermore, since the diode 98 is not required to carry the delatch current, the voltage and current stress on the diode are several orders of magnitude less than on Zener diode 78 and diode 80 of switching apparatus 42, thereby reducing the possibility of diode 98 failing.

FIG. 4 illustrates a switching apparatus 110 in accordance with a second embodiment of the invention. Switching apparatus 110 is the same as switching apparatus 90, except for its latching circuit portion. Instead of driving the latch coil with a current transformer associated with one of the motor windings, as above, one side of latch coil 62 may be grounded and the latch coil may be connected to input 92 of the switching apparatus by a series resonant circuit 112 comprising an inductor 114 and a capacitor 116, which have a resonant frequency different from the AC power frequency and the delatch pulse. A diode 118 permits current flow through the latch coil only in a direction which produces a magnetic field which closes switch 54. Preferably, the anode of diode 118 is connected to the series resonant circuit, as shown, so that current will flow through the latch coil only when the voltage at input 92 is positive. This prevents the negative delatch pulse from producing a current flow through the latch coil which could interfere with delatching. A second diode 120 may be connected in parallel with diode 118 and the latch coil, as illustrated, to prevent a large negative potential from being applied to diode 118 in its breakdown direction.

Latching may be accomplished in switching apparatus 110 by applying to power cable 34 an AC latching signal having a frequency equal to the series resonant frequency of inductor 114 and capacitor 116. Preferably, the AC latching signal has a frequency within the range of 400-1,000 Hz, and the values of inductor 114 and capacitor 116 are selected to provide a resonant frequency equal to the frequency of the latching signal employed. At series resonance, inductor 114 and capacitor 116 present a low impedance to the AC latching signal, allowing current to flow to diodes 118 and 120. On positive half-cycles of the AC latching signal, current flows through the latch coil and closes switch 54. However, at the AC power frequency, inductor 114 and capacitor 116 present a high impedance and attenuate the AC power frequency voltage sufficiently to prevent latching.

An advantage of switching apparatus 110 is that latching may be accomplished independently of whether motor 20 is energized. Moreover, a plurality of switching apparatuses 110, each responding to a different frequency latching signal, may be connected to the same cable and independently controlled from a single control and readout unit configured to generate the different frequency latching signals.

While preferred embodiments of the invention have been shown and described, it will be apparent to those skilled in the art that changes can be made in these embodiments without departing from the principles and spirit of the invention, the scope of which is defined in the appended claims.

I claim:

1. A downhole switching apparatus for controlling the connection of a downhole device to a cable which carries energizing current to a downhole motor, comprising switch means connected between the downhole device and the cable, the switch means having a closed position at which the downhole device is connected to the cable and having an open position at which the downhole device is disconnected from the cable, latching means responsive to a latching signal carried by the cable for closing the switch means, delatching means responsive to current flow of a predetermined direction therethrough for opening the switch means, frequency responsive means responsive to a delatching signal carried by the cable and capable of passing to the delatching means a current in said predetermined direction and a current in the opposite direction, and diode means connected in parallel with the delatching means for preventing current in said opposite direction from passing through the delatching means.

2. The apparatus claim 1, wherein the latching means and the delatching means comprise a latch and a delatch coil, respectively.

3. The apparatus of claim 1, wherein said frequency responsive means comprises a series resonant circuit having a resonant frequency substantially lower than the frequency of the downhole motor current and wherein said delatching means is responsive to a pulse of current in said predetermined direction therethrough for opening the switch means.

4. A downhole switching apparatus for controlling the connection of a downhole device to a cable which carries energizing current to a downhole motor, comprising switch means connected between the downhole device and the cable, the switch means having a closed position at which the downhole device is connected to the cable and having an open position at which the downhole device is disconnected from the cable, latching means responsive to a latching signal carried by the cable for closing the switch means, delatching means responsive to current flow of a predetermined direction therethrough for opening the switch means, frequency responsive means responsive to a delatching signal carried by the cable and capable of passing to the delatching means a current in said predetermined direction and a current in the opposite direction, and means connected to the delatching means for preventing current in said opposite direction from passing through the delatching means, wherein the latching means and the delatching means comprise a latch and a delatch coil, respectively, wherein the preventing means comprises a diode, wherein the delatching means further comprises a resistor connected in series with the delatch coil, and the diode is connected in parallel with the resistor and the delatch coil.

5. The apparatus of claim 4, wherein the diode is selected to have a low forward voltage drop at downhole temperatures.

6. A downhole switching apparatus for controlling the connection of a downhole device to a cable which carries energizing current to a downhole motor, comprising switch means connected between the downhole device and the cable, the switch means having a closed position at which the downhole device is connected to the cable and having an open position at which the downhole device is disconnected from the cable, latching means responsive to a latching signal carried by the cable for closing the switch means, delatching means responsive to current flow of a predetermined direction therethrough for opening the switch means, frequency responsive means responsive to a delatching signal carried by the cable and capable of passing to the delatching means a current in said predetermined direction and a current in the opposite direction, and means connected to the delatching means for preventing current in said opposite direction from passing through the delatching means, wherein the latching means and the delatching means comprise a latch and a delatch coil, respectively, wherein the preventing means comprises a diode, and further comprising another diode connected to the latch coil for permitting current flow through the latch coil only in a predetermined direction.

7. The apparatus of claim 6, wherein said first-mentioned diode is connected to the delatch coil such that it prevents current produced by a positive voltage on the cable from flowing through the delatch coil, and said other diode is connected to the latch coil such that is prevents current produced by a negative voltage on the cable from flowing through the latch coil.

8. A downhole switching apparatus for controlling the connection of a downhole device to a cable which carries energizing current to a downhole motor, comprising switch means connected between the downhole device and the cable, the switch means having a closed position at which the downhole device is connected to the cable and having an open position at which the downhole device is disconnected from the cable, latching means responsive to a latching signal carried by the cable for closing the switch means, delatching means responsive to current flow of a predetermined direction therethrough for opening the switch means, frequency responsive means responsive to a delatching signal carried by the cable and capable of passing to the delatching means a current in said predetermined direction and a current in the opposite direction, and means connected to the delatching means for preventing current in said opposite direction from passing through the delatching means, wherein the latching means and the delatching means comprise a latch and a delatch coil, respectively, wherein the preventing means comprises a diode, and further comprising another frequency responsive means connected to the latch coil for passing the latching signal to the latch coil and for blocking the delatching signal.

9. The apparatus of claim 8, wherein said latching signal is selected to have a frequency of the order of 400–1,000 Hz, and said other frequency responsive means comprises a series resonant circuit having a resonant frequency equal to the frequency of the latching signal.

10. A downhole switching apparatus for controlling the connection of a downhole device to a cable which carries energizing current to a downhole motor, comprising switch means connected between the downhole device and the cable, the switch means having a closed position at which the downhole device is connected to the cable and having an open position at which the downhole device is disconnected from the cable, latching means responsive to a latching signal carried by the cable for closing the switch means, delatching means responsive to current flow of a predetermined direction therethrough for opening the switch means, frequency responsive means responsive to a delatching signal carried by the cable and capable of passing to the delatching means a current in said predetermined direction and a current in the opposite direction, and means connected to the delatching means for preventing current in said opposite direction from passing through the delatching means, wherein the latching means and the delatching means comprise a latch and a delatch coil, respectively, wherein the preventing means comprises a diode, wherein said switch means comprises a normally open magnetically operated switch and a permanent magnet for holding the switch in closed position once it is closed, and wherein said latch and delatch coils are arranged to produce magnetic fields for respectively closing and opening the switch.

11. A downhole switching apparatus for controlling the connection of a downhole device to a cable which carries energizing current to a downhole motor, comprising switch means connected between the downhole device and the cable, the switch means having a closed position at which the downhole device is connected to the cable and having an open position at which the downhole device is disconnected from the cable, latching means responsive to a latching signal carried by the cable for closing the switch means, delatching means responsive to current flow of a predetermined direction therethrough for opening the switch means, frequency responsive means responsive to a delatching signal carried by the cable and capable of passing to the delatching means a current in said predetermined direction and a current in the opposite direction, and means connected to the delatching means for preventing current in said opposite direction from passing through the delatching means, wherein said frequency responsive means comprises an inductor and a capacitor connected in series to form a series resonant circuit, the values of the inductor and the capacitor being selected to provide a resonant frequency such that the impedance of the series resonant circuit is high at the frequency of the downhole motor current and at the frequency of the latching signal, and is low at the frequency of the delatching signal.

12. The apparatus of claim 11, wherein said resonant frequency is of the order of 1–5 Hz.

13. The apparatus of claim 11, wherein said delatching signal is a pulse having a pulse width of the order of 100 milliseconds to 1 second.

14. The apparatus of claim 11, wherein said inductor is connected between the cable and the downhole device, and the values of the inductor and the capacitor are selected to provide a high ratio of inductor impedance to capacitor impedance at the frequency of the downhole motor current to inhibit downhole motor current flow through the downhole device.

15. The apparatus of claim 14, wherein said delatching means comprises a delatch coil and a resistor connected in series to said capacitor, and wherein said preventing means comprises a diode connected in parallel with said resistor and delatch coil.

16. The apparatus of claim 15, wherein the value of said resistor is selected in relation to the impedance of the delatch coil such that the portion of the forward voltage drop of the diode which is applied to the delatch coil when the diode conducts is insufficient to produce a current flow through the delatch coil in a direction opposite to said predetermined direction having a magnitude sufficient to close the switch means.

17. The apparatus of claim 14, further comprising a parallel resonant circuit connected between the inductor and the downhole device, the parallel resonant circuit having a resonant frequency equal to the frequency of the downhole motdr current.

* * * * *